(12) United States Patent
Spears et al.

(10) Patent No.: US 9,338,238 B2
(45) Date of Patent: May 10, 2016

(54) OPERATION SCHEDULER FOR A BUILDING AUTOMATION SYSTEM

(75) Inventors: Lonnie Douglas Spears, Racine, WI (US); Charles James Koerner, Aurora, IL (US); Michael J. Marchi, Algoquin, IL (US); Patrick M. Nickels, Palatine, IL (US); Michael J. Baum, Village of Lakewood, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1143 days.

(21) Appl. No.: 13/310,484

(22) Filed: Dec. 2, 2011

(65) Prior Publication Data

US 2012/0143378 A1    Jun. 7, 2012

Related U.S. Application Data

(60) Provisional application No. 61/419,370, filed on Dec. 3, 2010.

(51) Int. Cl.
  *G01M 1/38*    (2006.01)
  *H04L 29/08*   (2006.01)
  *H04L 12/28*   (2006.01)

(52) U.S. Cl.
  CPC ............ *H04L 67/125* (2013.01); *H04L 12/282* (2013.01); *H04L 12/2821* (2013.01); *H04L 2012/285* (2013.01); *H04L 2012/2849* (2013.01)

(58) Field of Classification Search
  CPC ............... H04L 67/125; H04L 2012/2849; H04L 12/2821; H04L 12/282; H04L 2012/285
  USPC ........................................ 700/17, 19, 83, 275
  See application file for complete search history.

(56) References Cited

U.S. PATENT DOCUMENTS

2008/0222565 A1    9/2008  Taylor et al.
2010/0142535 A1*   6/2010  Swainston .................. 370/395.3

FOREIGN PATENT DOCUMENTS

JP        07141439 A    * 11/1993
WO       2005/091218 A2    9/2005
WO       2008/141356 A1   11/2008

OTHER PUBLICATIONS

PCT Search Report for PCT/US2011/063268, dated May 23, 2012.

* cited by examiner

*Primary Examiner* — Sean Shechtman
*Assistant Examiner* — Chad Rapp

(57) ABSTRACT

A computer-implemented method for managing and controlling multiple automation components coupled via a building automation network. The computer implemented method includes receiving, via the building automation network, a first operational schedule from a first automation device where the first operational schedule is formatted according to a first protocol, receiving, via the building automation network, a second operational schedule from a second automation device where the second operational schedule is formatted according to a second protocol, converting the received second operational schedule from the second protocol to the first protocol, generating a unified schedule that includes the first operational schedule and the converted second operational schedule, and displaying the unified schedule in a user accessible manner.

35 Claims, 5 Drawing Sheets

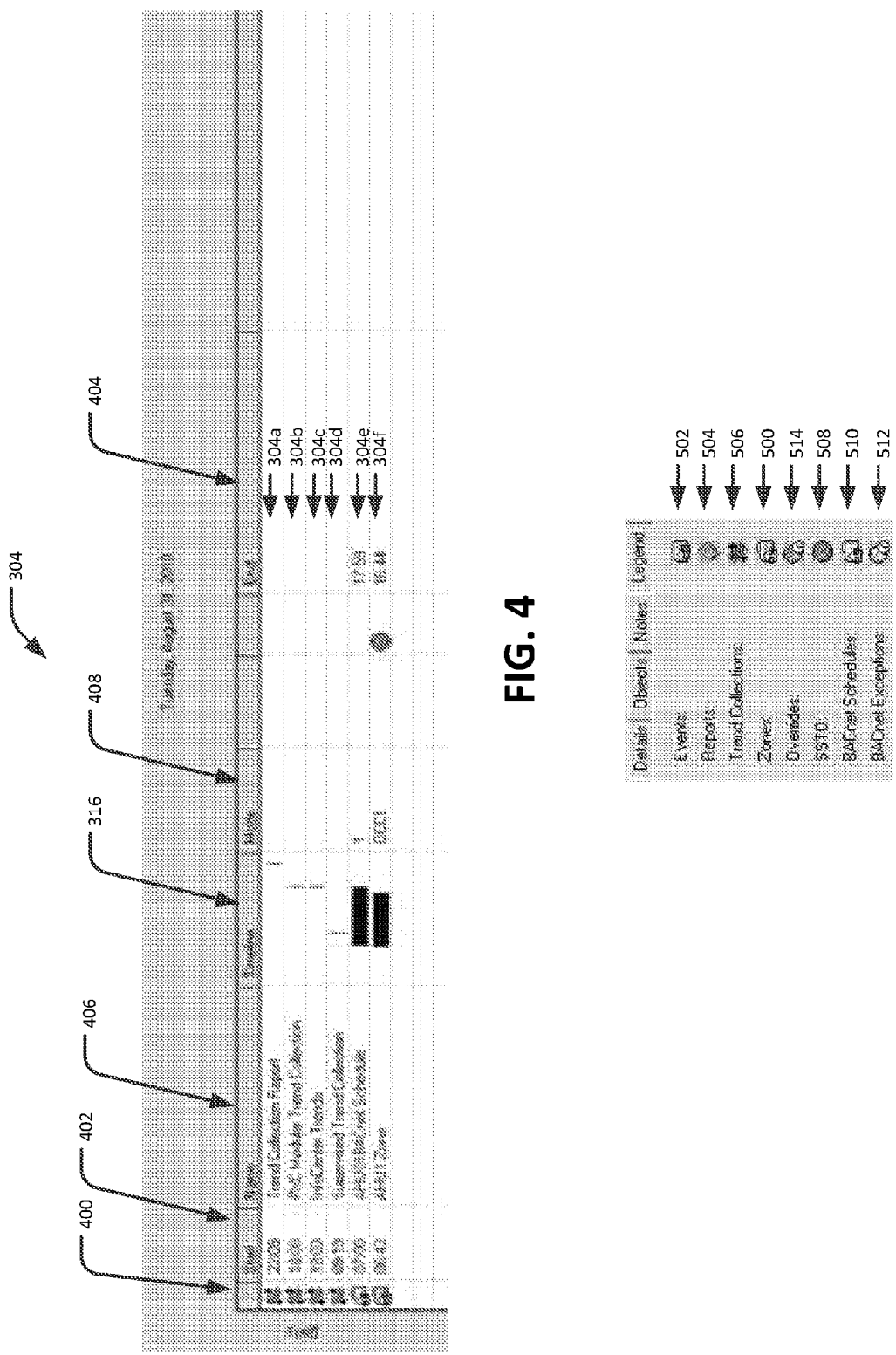

OPERATION SCHEDULER FOR A BUILDING AUTOMATION SYSTEM

PRIORITY CLAIM

This patent claims the priority benefit under 35 U.S.C. §119(e) of U.S. provisional patent application Ser. No. 61/419,370, filed on Dec. 3, 2010, the content of which is hereby incorporated by reference to the extent allowed by law.

BACKGROUND

Conventional building automation systems incorporate automation components, sensors, equipment and devices to control and monitor environmental conditions and equipment operations within a structure. The automation components, sensors, equipment and devices are deployed throughout the structure and provide the information necessary to control one or more environmental variables within the structure. To this end, the automation components, sensors, equipment and devices are often operated in a coordinated manner based on, for example, a timed schedule, detected condition, received command or other input. In this way, conventional building automation systems may adjust and control, for example, lighting levels and HVAC systems of an entire building according to a timed schedule and one or more detected events. In practice, building automation systems often utilize and incorporate automation components, sensors, equipment and devices supplied by different vendors and manufacturers. The different suppliers configure their proprietary automation components, sensors, equipment and devices according to different protocols and control schemes in order to maximize operational performance. These different protocols and control schemes prevent direct communication and information exchange between the automation components, sensors, equipment and devices. These different protocols and control schemes further make programming and control of the automation components, sensors, equipment and devices difficult. Moreover, the variety of automation components, sensors, equipment and devices as well as the different operating protocols utilized and distributed throughout conventional building automation systems often create coordination and monitoring difficulties.

SUMMARY

This patent document relates to an automation control tool configured to generate an operations scheduler that provides a unified interface or mechanism for monitoring and controlling automation components, sensors, equipment and devices operable within a building automation system. Moreover, disclosed operations scheduler and building automation control tool may interact with automation components, sensors, equipment and devices that utilize and/or are configured according to different communication and operational protocols.

The disclosed automation control tool and operations scheduler may be configured to direct the operation of automation components, sensors, equipment and devices based on one or more operational schedules that may be designed years in advance. Similarly, the disclosed automation control tool and operations scheduler may implement and execute reporting, trending and analysis functionality based to monitor and track aspects or elements of the operational schedule. In this way, the disclosed automation control tool and operations scheduler provides a valuable mechanism with which long-term planning and control may be accomplished. The operational schedules defined and controlled by the disclosed automation control tool and operations scheduler may be implemented to ensure coordinated interoperability with a high degree of precision and reliability between the automation components, sensors, equipment and devices operating within the building automation system.

The disclosed automation control tool and operations scheduler may further be configured to organize equipment, devices and modules operating with the building automation system into logical groupings or zones. Multiple zones or groupings can be further combined to generate or define a group. Operational schedules defined or stored by the disclosed automation control tool and operations scheduler may, in an exemplary embodiment, contain a start time and a stop time for each equipment event within each zone or group of zones. Operational schedules may further define the start or initiation time at which the automation control tool begins to generate desired reports, trend collection or other analysis functions.

In one embodiment, a building automation control tool configured to manage and control multiple automation components couple via a building automation network is disclosed. The building automation control tool includes a processor, a memory in communication with the processor and configured to store one or more processor implementable instructions. The processor implementable instructions are configured to receive a first operational schedule comprising a first start time and a first stop time related to the operation of a first automation device, receive a second operational schedule comprising a second start time and a second stop time related to the operation of a second automation device, recognize the first and second start and stop times associated with the first and second operational schedules, respectively, and generate a unified schedule that: displays the first operational schedule as a first time period that extends between the first start time and the first stop time; and displays the second operational schedule as a second time period that extends between the second start time and the second stop time, wherein the second time period is aligned relative to the first time period.

In another embodiment, a computer-implemented method for managing and controlling multiple automation components coupled via a building automation network. The computer implemented method includes receiving, via the building automation network, a first operational schedule detailing a first operational period of a first automation device, such that the first operational schedule is formatted according to a first protocol, receiving, via the building automation network, a second operational schedule detailing a second operational period of a second automation device, such that the second operational schedule is formatted according to a second protocol, converting the received second operational schedule from the second protocol to the first protocol, generating a unified schedule based on the first operational schedule and the converted second operational schedule, such that the unified schedule arranges the first operational time period relative to the second operational time period, and displaying the unified schedule in a user accessible manner.

In another embodiment, a computer-implemented method for managing and controlling multiple automation components coupled via a building automation network is disclosed. The computer implemented method includes generating, at a workstation, a unified schedule that includes a first operational schedule associated with a first automation device and a second operational schedule associated with a second automation device, determining operational protocols for the first automation device and the second automation device, communicating, via the building automation network, the first operational schedule to the first automation device according to a first protocol, converting the second operational schedule to a second protocol, communicating, via the building automation network, the second operational schedule to the second automation device according to the second protocol, and executing the first operational schedule at the first automation device, and the second operational schedule at the second automation device.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIGS. 4 and 5 illustrate another embodiment of a unified schedule and process legend that may be recognized by the operation scheduler module and automation control tool implemented in accordance with the disclosure provided herein.

DETAILED DESCRIPTION

Figure 1:
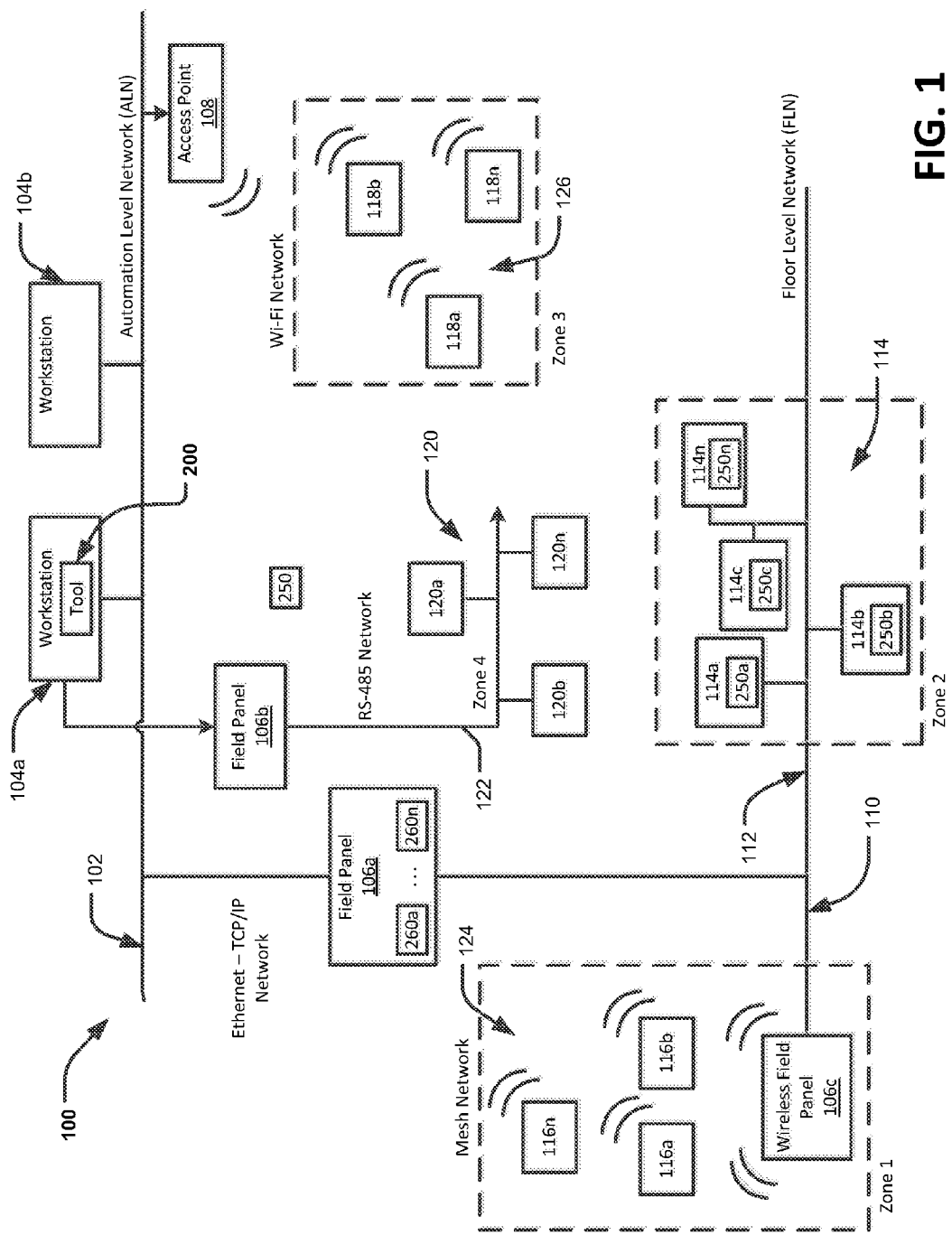
FIG. 1 illustrates one embodiment of a building automation system configured to implement an automation control tool and operations scheduler in accordance with the disclosure provided herein.

The disclosed automation control tool and operations scheduler may be configured to provide a unified interface or schedule display for monitoring and controlling the operations of, and generating reports related to, the devices and components operable within a building automation system. For example, activity schedule and reports may be designed and implemented years in advance in accordance with a long-term control strategy to direct individual devices and equipment with a high degree of precision and reliability. In this way, control plans and activity schedules for a building may be defined far in advance which address seasonal changes in temperature, daylight and other long-term environmental conditions. In one embodiment, the building lighting control scheme may be adjusted or controlled utilizing the disclosed operations scheduler and automation control tool to compensate for changes in the ambient lighting conditions. In another embodiment, the building HVAC control scheme may be adjusted or controlled utilizing the disclosed automation control tool and operations to compensate for changes in the ambient temperature or weather conditions associated with typical seasonal variations. The building HVAC control scheme may further be adjusted or edited to compensate for sensed or detected conditions that deviate from the expected seasonal variations.

The disclosed automation control tool and operations scheduler may be configured to organize equipment, devices and modules operating with the building automation system into logical groupings or zones. Multiple zones or groupings can be further combined to define a group. Schedules defined or stored by the disclosed automation control tool and operations scheduler may, in an exemplary embodiment, contain a start time and a stop time for the equipment and tasks within a single zone or multiple zones and/or groups. The schedule may further include a start time for activation of a report generation module reports, and trend collection and analysis modules. All of these disclosed activity and operation schedule, data collection and report generation routines may be gathered and recognized by the operations scheduler module portion of the automation control tool. The operations scheduler module, in turn, may utilize the gathered activity and schedule information to generate a unified schedule that includes activity time lines or periods representing the duration of each activity and operation schedule as well as the data collection and report generation activity. Each of these elements or activities may be displayed relative to each other thereby providing a user with a holistic mechanism by which the operation of the building automation system may be overseen.

A. Building Automation System Layout

The embodiments discussed are directed to tools, methods and devices for organizing, managing and controlling one or more environmental control devices, building automation components, and wireless devices configured for use within a building automation system. The devices and components may be BACNet, IEEE 802.15.4/ZigBee-compliant devices such as, for example, one or more personal area network (PAN) coordinators implemented as a field panel (FPX or PXC); a full function device (FFD) implemented as a floor level device transceiver (FLNX); and a reduced function device (RFD) implemented as a wireless room temperature sensor (WRTS). The devices and components identified herein are provided as an example of automation devices, building automation components, wireless devices that may be integrated and utilized within a structure; these examples are not intended to limit the type, functionality and interoperability of the devices and teaching discussed and claimed herein.

One exemplary building automation system that may include and implement the tools, method and devices for organizing, managing and controlling one or more is the APOGEE® system provided by Siemens Industry, Inc., Building Technologies Division (hereinafter "Siemens"). The APOGEE® system may further implement the automation control tool and operation scheduler module that interacts with and displays schedule and control information for, for example, a proprietary or Siemen's specific version of the BACnet protocol that maximizes the features and capabilities of building automation components and devices manufactured and provided by Siemens. In another embodiment, the automation control tool and the integral operation scheduler module operable with the APOGEE® system may interact with and display schedules for objects and devices that operate according to a standardized version of the BACnet protocol. In an exemplary configuration, the APOGEE® system including the automation control tool and operation scheduler module provides a mechanism for integration of multiple building systems and devices from different manufacturers. In this way, an WRTS manufactured by Siemens may communicate data to an APOGEE® field panel (FPX or PXC) for utilization therein and/or distribution to one or more sensors, actuators, drives, and environmental control devices provided by a different manufacturer.

FIG. 1 illustrates an exemplary building automation system or control system 100 that may incorporate and implement the automation control tool and method for operation scheduling as disclosed herein. The building automation system 100 includes a first network 102 such as an automation level network (ALN) or management level network (MLN) in communication with one or more INSIGHT® workstations 104 (individually identified as workstations 104a and 104b) in communication with one or more APOGEE® compatible field panels 106 (individually identified as field panels 106a and 106b) or an access point 108. In one exemplary embodiment, the each of the field panels 106 may be a PXC Modular field panel provided by Siemens. The field panels 106 are programmable devices that may couple the first network 102 to a second network 110 such as a floor level network (FLN) and/or other environmental control devices and building automation components as discussed and described herein.

The second network 110, in this exemplary embodiment, may include a wired network 112 that connects to automation devices 114 (individually identified as automation devices 114a to 114n) to the field panel 106a. The second network 110 may further be coupled to a wireless mesh network 124 composed of automation devices 116 (individually identified as wireless automation devices 116a to 116n) through a wireless field panel 106c. For example, the automation devices 116 may be wirelessly deployed within a room or space and in communication with an IEEE 802.15.4 (ZigBee) compatible field panel 106c deployed elsewhere within the structure. In another embodiment, the automation devices 114 and 116 may be mixed or interspersed within a single room to form a plurality of mixed mode (i.e., both wired and wireless) connections to the field panels 106a and 106c.

The building automation system 100 may further include automation devices 118 (individually identified by the reference numerals 118a to 118n) wirelessly deployed according to the IEEE 802.11 (Wi-Fi) standard to define a Wi-Fi network 124. The automation devices 118 may, in turn, communicate with the network 102 via a Wi-Fi compatible access point 108. The devices 118a to 118n such as, for example, temperature sensors, damper actuators, computing devices and other building automation components can be configured to wirelessly communicate information between each other and a wireless access point 108. In operation, the device 118a may communicate with other devices 118b to 118n within the Wi-Fi network 126 by sending a message addressed to an Internet Protocol (IP) address, a device alias, a media access control (MAC) address or other network identifier assigned to one or more of the automation devices 118a to 116n and the wireless access point 108.

The workstation 104a may, in one exemplary configuration, communicate with automation devices 120 (individually identified as automation devices 120a to 120n) via the field panel 106b and an RS-485 network 122. In this configuration, the workstation 104a may be in direct and/or multiplexed communication with the field panel 106b via a three or four wire network configuration.

The workstation 104a may further include and store an exemplary automation control tool 200 configured to implement the included operation scheduler module 201 and the associated functionality discussed and disclosed herein. As discussed below, the automation control tool 200 may be stored in a memory and executed by a processor operable within the workstation 104a. The automation control tool 200 may utilize and exchange data, as discussed below, with the one or more of the automation devices 114, 116, 118 and 120.

B. General Computing System Layout

Figure 2:
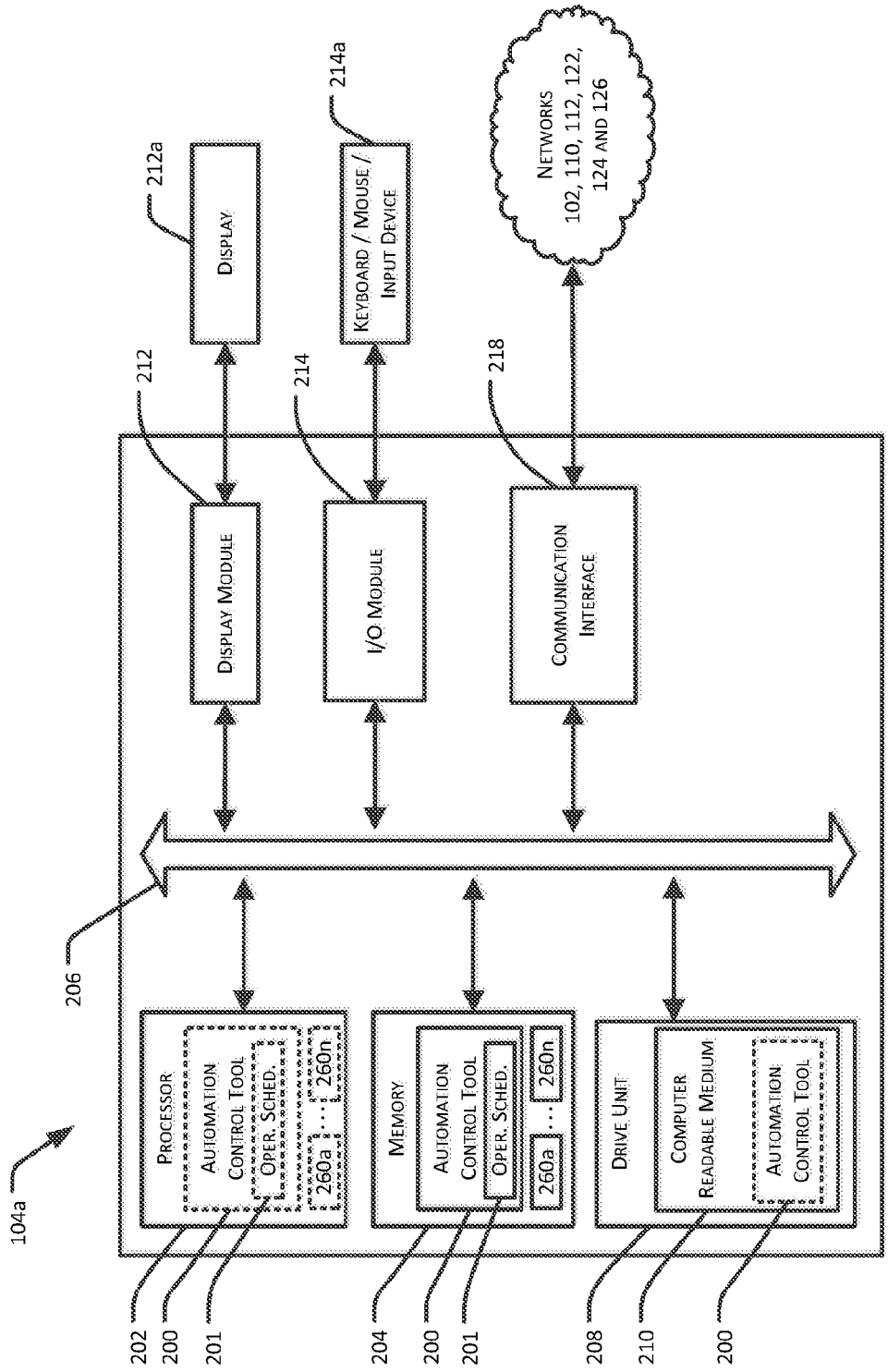
FIG. 2 depicts an internal functional block diagram of an exemplary computer system configured to implement an automation control tool and operations scheduler in accordance with the disclosure provided herein.

FIG. 2 illustrates a generalized and exemplary internal functional block diagram and configuration for the workstation 104a. In one exemplary embodiment, the workstation 104a stores and executes the automation control tool 200, the operation scheduler module 201, a schedule creation and editing module (not shown), and other algorithms and processor-executable instructions to cause the performance of any one or more of the methods or computer based functions discussed and disclosed herein. The workstation 104a may operate as a standalone device or may be connected to another workstation 104b, computer systems or peripheral devices via, for example the network 102.

In a networked deployment, the workstation 104a (referred to hereinafter as the workstation 104) may operate in the capacity of either a server or a client computer in a server-client network environment, or as a peer computer system in a peer-to-peer (or distributed) network environment. The workstation 104 may also be implemented as or incorporated into various devices, such as a personal computer (PC), a tablet PC, a personal digital assistant (PDA), a mobile device, a laptop computer, a desktop computer, or any other machine capable of executing the automation control tool 200.

The workstation 104 includes a processor 202, such as, a central processing unit (CPU), a graphics-processing unit (GPU), or both. The processor 202 may be a component in a variety of systems. For example, the processor 202 may be part of a standard personal computer or a controller. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The workstation 104 may include a memory 204 that can communicate with the processor 202 via a bus 206. The memory 204 can be divided or segmented into, for example, a main memory, a static memory, and a dynamic memory. The memory 204 includes, but may not be limited to, computer readable storage media and various types of volatile and non-volatile storage media such as: random access memory; read-only memory; programmable read-only memory; electrically programmable read-only memory; electrically erasable read-only memory; flash memory; magnetic tape or disk; optical media and other computer readable medium. In one case, the memory 204 includes a cache or random access memory for the processor 202. Alternatively, or in addition to, the memory 204 may be system memory that is separated and/or distinct from the processor 202.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is configured to store the automation control tool 200, the operation scheduler module 201 and one or more reduced data files 260a to 260n utilizable by the processor 202 to generate and implement the operation scheduler functionality as disclosed herein. The functions, acts or tasks illustrated in the figures or described herein may be performed by the programmed processor 202 executing the instructions such as the automation control tool 200 and the operation scheduler module 201 in connection with the information and/or data stored in the reduced data files 260a to 260n (shown as a dashed line when accessed by the processor 202.) The automation control routine 200 and the data from the reduced data files 260a to 260n may be loaded via the bus 206 from a storage location in the memory 204 for use by the operation scheduler module 201. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The workstation 104, in other embodiments, includes a disk or optical drive unit 208 to accessibly interpret a computer-readable medium 210 on which software embodying, for example, a copy or backup of the automation control tool 200 (shown as a dashed line) or other processor-executable instructions are embedded and stored. The automation control tool 200 or other processor-executable instructions may, as shown in FIG. 2, reside completely, or at least partially, within the memory 204 and/or within the processor 202 during execution by the workstation 104.

The workstation 104 may further include a display module 212 coupled to, and communicating with, a liquid crystal display (LCD), an organic light emitting diode (OLED), a flat panel display, a solid state display, a cathode ray tube (CRT), a projector, a printer or other now known or later developed display device 212a for outputting determined information. The display device 212a, operating in conjunction with an input/output (I/O) module 214, acts as an interface for a user to see the functioning of the processor 202 and interact with the software and automation control tool 200 stored in the memory 204 or in the drive unit 206.

The input/output module 214 may be configured to allow a user to interact with any of the components of workstation 104. The input module 214 may be, for example, a number pad, a keyboard, or a cursor control device, such as a mouse, or a joystick, touch screen display, remote control or any other device 214a operative to interact with the display device 212a and the workstation 104.

The workstation 104 may utilize a communication interface 218 implemented in software or hardware to establish a connection with, for example, one or more of the networks 102, 110, 112, 122, 124 and 126, one or more of the input devices 214a, the display device 212a, or any other components.

The computer-readable medium 210 be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 210 may include a solid-state memory such as a memory card or other package that houses one or more non-volatile read-only memories. The computer-readable medium 210 further includes or encompasses random access memory or other volatile re-writable memory. Additionally, the computer-readable medium 210 may include a magneto-optical or optical medium, such as a disk or tapes or other storage device to capture carrier wave signals such as a signal communicated over a transmission medium. The present disclosure may be considered to include any one or more of a computer-readable medium or a distribution medium and other equivalents and successor media, in which data or instructions may be stored.

In other embodiments, dedicated hardware implementations, such as application specific integrated circuits (ASIC), programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

C. Operation Scheduler

In one embodiment, the automation control tool 200 implements the operation schedule module 201 and associated functionality necessary to provide a unified interface or display for monitoring and controlling the system operations and reports of one or more of the automation devices 114, 116, 118 and 120. For example, the operation schedule module 201 portion of the automation control tool 200 may display reports designed and formatted years in advance to manage, for example, the operation and health of automation devices 114. These long-range control plans and schedules may direct one or more of the automation devices 114 to address seasonal changes in temperature, daylight and other long-term environmental conditions. In order to implement the desired environmental control, the automation control tool 200 generates a display via the operation scheduler module 201 to allow a user to visualize and control the ambient lighting conditions and schedules operable within the building automation system 100. In another embodiment, the automation control tool 200 and operation scheduler module 201 provides a mechanism by which a user may adjust and control a building HVAC control scheme. For example, a user may interact with the automation control tool 200 and operation scheduler module 201 provides via the display 212a and input devices 214a to monitor and adjust the operation of one or more of the automation devices 114, 116, 118 and 120. In response to the user input, the automation control tool 200 may generate commands and signals to implement a change or initiate an activity at one of the identified automation devices 114, 116, 118 and 120. The automation devices 114, 116, 118 and 120, in turn, operate to adjust and monitor the building HVAC control scheme based on the received commands and signals in order to control building automation system 100 and/or compensate for changes in the ambient temperature or weather conditions associated with typical seasonal variations. The building HVAC control scheme may further be adjusted or edited to compensate for sensed or detected conditions that may deviate from the expected typical seasonal variations.

The disclosed operation schedule module 201 portion of the automation control tool 200 provides the desired functionality to organize each group of automation devices 114, 116, 118 and 120 into corresponding logical groupings or zones 1 to 4 (see FIG. 1) within the building automation system 100. In other embodiments, the zones may include any combination of automation devices 114, 116, 118 and 120 based on, for example, physical location, manufacturer, operating system and version, or any other desired characteristic or variable. One or more of the zones 1 to 4 may be further combined to generate or define a group. By grouping automation devices 114, 116, 118 and 120 into zones and groups, the operation schedule module 201 portion of the automation control tool 200 may affect collective control and monitoring over multiple devices and groups of devices.

The schedules organized and displayed by the disclosed operation scheduler module 201 may be based on information contained within a structured data file. For example, the structured data file could include an automation device identifier, a zone and/or event indicator, a start time, and a stop time. The structured data file may be an extensible markup language (XML) file utilized to define and identify data for use by the operation schedule module 201 portion of the automation control tool 200. Returning to FIG. 1, each of the exemplary automation devices 114a to 114n may include and store a corresponding structured data file 250a to 250n that contains the information, variables, and data structures necessary to operate any one of the devices. The field panel 106a can, in turn, store one or more reduced data files 260a to 260n that represent a filtered and compressed version of the structured data files 250a to 250n. These reduced data files 260a to 260n include the information, data and values required by the operation schedule module 201 portion of the automation control tool 200 to generate the unified schedule 300 and display (see, for example, FIG. 3).

In one embodiment, the data file 250n stored within, for example, the corresponding automation device 114n is a full and detailed structured data file containing device thresholds, controller constants, data tables, addressing information, historical data or any other information. The full data file 250n may further include the schedule identifier, the zone and/or event indicator, the start time, and the stop time as well as any other data, information and fields contained within the corresponding reduced data file 260n. The size and complexity of the information and data contained and identified within the XML structure of the full data file 250n can cause manipulation and transmission difficulties. For example, transmission of the full data file 250n may require a large amount of network bandwidth and time to complete the transfer. The increased network utilization requirements may, in turn, degrade performance of the building automation system 100. Moreover, if the transmission time becomes too great, the communicated information and data may no longer be up-to-date causing a further degradation in the performance of the building automation system 100

In order to address these difficulties, the automation control tool 200 may provide a mechanism or tool to segment and compress the full data file 250n into a reduced or compressed data file 260n for use by the operation scheduler module 201. In one embodiment, the automation control tool 200 may provide a mechanism by which specific elements, fields and sections of the full data file 250n may be selected or identified for inclusion in the reduced or compressed data file 260n. In this way, the reduced data file 260n can be designed and customized by a user to contain only the specific fields and inputs required for the generation of a unified schedule 300 (see FIG. 3). Thus, the reduced data file 260n represents a compressed file that includes information and data extracted from the full data file 250. By extracting specific fields and information from each of the structured data files 250 stored within one or more of the automation devices 114, 116, 118 and 120, the automation control tool 200 can collect the information and data necessary for the execution of the operations scheduler module 201 without degrading the communication performance of the entire building automation system 100. Moreover, the reduced data files 260a to 260n can be retrievably stored in each of the field panels 106 to thereby eliminate the need for the automation control tool 200 and/or the operations scheduler module 201 to directly request schedule information from each of the automation devices 114, 116, 118 and 120.

By filtering each of the structured data files 250 to remove extraneous fields, information and data not required by the operations scheduler module 201 for the generation of the unified schedule 300, specific information and data may be gathered and collected from a wide array of automation devices operating according to numerous different standardized and proprietary communication protocols such as BACnet MS/TP and Modbus. For example, in order to create a reduced data file 260, the automation control tool 200 may be configured to extract specific fields and information from the structured data file 250 relating to the automation device identifier, the zone and/or event indicator, the start time, and the stop time for each of the one or more of the automation devices 114, 116, 118 and 120. The start and stop times can, in turn, be utilized by the operations scheduler module 201 determine an operation or operating window that reflect the time period over which an given device or group of device are active to control or monitor aspects of the building automation system 100. Because the automation control tool 200 only extracts and processes the specific fields necessary to generate the unified schedule 300, the structured data files 250 can be formatted according to a variety of standard and proprietary BACnet communication protocols without increasing the likelihood of a data conflict resulting from missing, corrupt and/or mislabeled information.

Removal of extraneous information and data by the automation control tool 200 effectively compresses the amount of information required for transmission via the networks 102, 110, 112, 122, 124 and 126. In one embodiment, additional compression may be achieved by substituting repetitive information with a predefined character or code. Alternatively, or in addition to, if each of the reduced data files 260 is organized in the same manner, the common structure and names may be ignored and the remaining information and data that defines the scheduling information can be communicated from the field panel 106 for reconstruction by the operations scheduler module 201 portion of the automation control tool 200.

In another embodiment, reduced data files 260 associated with each of the automation devices 118 may be stored in a queue defined within the access point 108. Alternatively, the reduced data files 260 associated with the automation devices 118 can be communicated via the network 102 to one or more of the workstations 104a and 104b for storage. In yet another embodiment, the automation control tool 200 can query one or more of the field panels 106a to 106c and the access point 108 identified as a central collection point(s) in order to retrieve the information and data contained within the reduced data files 260 for use by the operations scheduler module 201.

Figure 3:
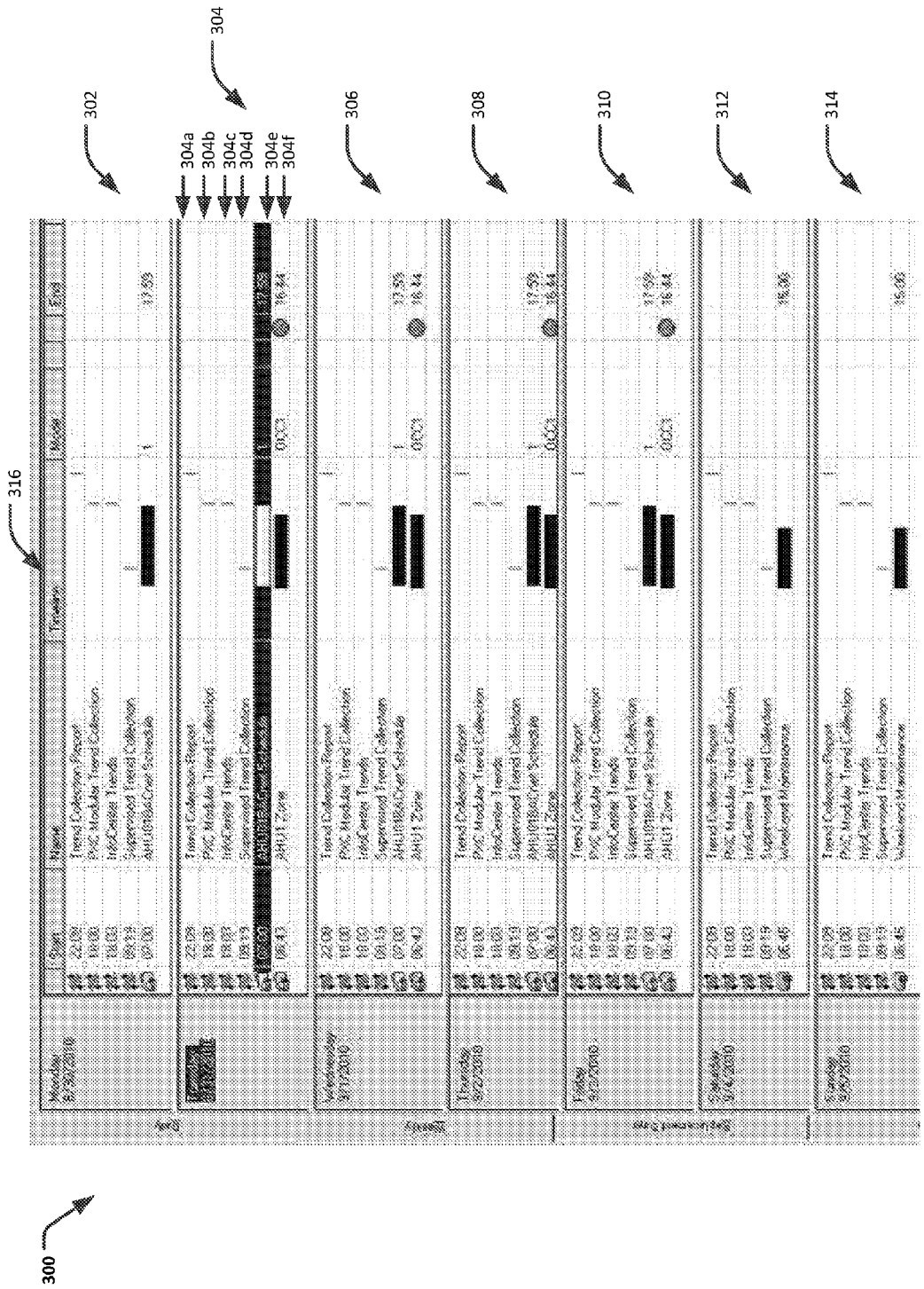
FIG. 3 illustrates one embodiment of a unified schedule that may be generated by the operations scheduler module and the automation control tool disclosed herein.

FIG. 3 illustrates an implementation of the display generated by the operations scheduler module 201 portion of the automation control tool 200. In particular, FIG. 3 illustrates one embodiment of the unified schedule 300 that may be assembled in a multipaneled configuration by the operations scheduler module 201 portion of the automation control tool 200 to organize and control the activities associated with one or more of the automation devices 114, 116, 118 and 120. In this illustrated embodiment, the unified schedule 300 displays an exemplary multipaneled schedule in which each of the panels 302 to 314 corresponding to a day of the week (e.g., Monday, Tuesday, etc.) The exemplary multipaneled view of the unified schedule 300 displays a weekly view detailing the operations and actions performed by one or more of the automation devices 114, 116, 118 and 120. The exemplary multipaneled view of the unified schedule 300 further displays the data collection routines and reports generated by the operation scheduler module 201. For example, panel 304 illustrates schedules 304a to 304d indicating that four reports and/or collection routines are be initiated on Tuesday, Aug. 31, 2010. Specifically, the operation scheduler module 201 generates a timeline 316 that illustrates, relative to each other, when the schedules 304a to 304d corresponding to each of the reports and/or collection routines will occur on a given day. For example, the panel 304 of the unified schedule 300 illustrates via schedule 304d that a trend collection routine is initiated at approximately 0900. The panel 304 further illustrates via schedules 304b and 304c that two additional trend collection routines are initiated at approximately 1800. The schedule 304a indicates that a trend collection report 304a is generated at approximately 2200 after each of the preceding trend collection routines 304b to 304d have been completed and the data or information stored in the memory 204.

Schedules 304e and 304f similarly indicate the operational or activity period of a device and zone, respectively, operating within the building automation system 100. In one exemplary embodiment, the trend collection and report routines 304a to 304d may collect performance information and data related to two automation devices or zones controlled by schedules 304e and 304f. For example, the operation schedule 304e may control the activity implemented by one of the automation components 114, 116, 118 and 120. In this exemplary embodiment, the operation schedule 304e indicates that the controlled device is active from approximately 0700 to 1800. The schedule 304f may similarly control the activity of a logical group of automation devices 114, 116, 118 and 120 from approximately 0645 to 1645.

The timeline 316 generated and assembled by the operation schedule module 201 portion of the automation control tool 200 provides a graphical representation of the start and stop times associated with each of the schedule 304a to 304d. Each time periods is represented as a linear bar that corresponds to the duration of each process and routine over a common time frame (e.g., a 24 hour time period representing Tuesday, Aug. 31, 2010). In this manner, the unified schedule 300 generated by the operations scheduler module 201 portion of the automation control routine 200 can provide a visual mechanism through which the activity of any one of the automation devices 114, 116, 118 and 120 can be compared, controlled and monitored relative to other devices and schedules.

FIG. 4 illustrates an enlarged single-day view of a portion of the unified schedule 300 related to the panel 304 (e.g., Tuesday, Aug. 31, 2010). The panel 304 includes: a category icon 400, a start time 402, an end time 404, a schedule name or identifier 406, the timeline 316 and a mode 408. As shown in FIG. 5, the category icon 400 provides a visual indicator or icon representing the schedule type recognized by the operation schedule module 201 portion of the automation control tool 200 and displayed by the unified schedule 300. Schedule types may include: proprietary schedules that control and direct the equipment and reporting operations associated with a zone or group; and standard BACnet schedule objects which define or establish a periodic schedule of events that may repeat within a range of dates. In particular, BACnet schedule objects (indicated by the icon corresponding to the reference numeral 510) control and define when equipment and reporting operations are to be conducted during normal days of a week as well as exception days. Exceptions (indicated by the icon corresponding to reference numeral 512) provide the ability to modify and replace a single instance or day of a reoccurring schedule. For example, a schedule may be setup to run Monday through Friday 8:00 AM to 5:00 PM. However, when a holiday occurs during the week an exception or override may be used to implement a holiday schedule. An override (indicated by the icon corresponding to the reference numeral 514) may be used in place of an exception (see icon 512) to replace a portion of a schedule such as a particular operation or task. In effect, an override may be utilized to replace one of the schedules 304a to 304d (see FIG. 3) will an alternate schedule on one or more desired days or time periods represented by the panels 302 to 314.

In one example, a zone icon (indicated by the reference numeral 500) may represent one or more of the logical grouping of one or more of the automation devices 114, 116, 118 and 120 in the zones 1 to 4 (see FIG. 1). Multiple zones 1 to 4 representing, for example, automation devices deployed on different floors within a structure can be further grouped or combined into a group (corresponding to an icon indicated by the reference numeral 502). In this example, execution or activation of the schedule associated with the group 502 may be used to control the lighting and temperature throughout an entire structure. The execution and activation may be determined according to a start stop time optimization (SSTO) algorithm (indicated by the icon corresponding to reference numeral 508). An exemplary SSTO algorithm or operation automatically determines the best start time for equipment operating within one of the zones 1 to 4. In one example, if the schedule states that the room needs to be 70 F at 8:00 AM, the SSTO algorithm will determine the optimum start time to ensure that the room is at the desired temperature at the specified time. Other represented schedule types could include reports (indicated by the icon corresponding to reference numeral 504) and trend collections (indicated by the icon corresponding to reference numeral 506) that indicate when data is to be collected and/or correlated by the automation control tool 200 and the building automation system 100. In this way, the functions, capabilities and type of a given schedule 304a to 304f can be visually represented within the unified schedule 300 generated by the operation schedule module 201.

The indicated start and stop times 402 and 404 identify how long a given action or control operates for each zone or group named or listed by the schedule name or identifier 406. The timeline 316, as previously discussed, provides a visual indication of the duration between the identified start and stop times 402 and 404. If the schedule type is a report (see icon 504) or trend collection routine (see icon 506), then the start time 402 is used to initiate the report generation and a stop time 404 is not necessary. When a report or trend collection routine is indicated, the timeline 316 simply identifies the point in time when the report generation starts but provides no indication of how long the reporting process takes to complete.

Figure 6:
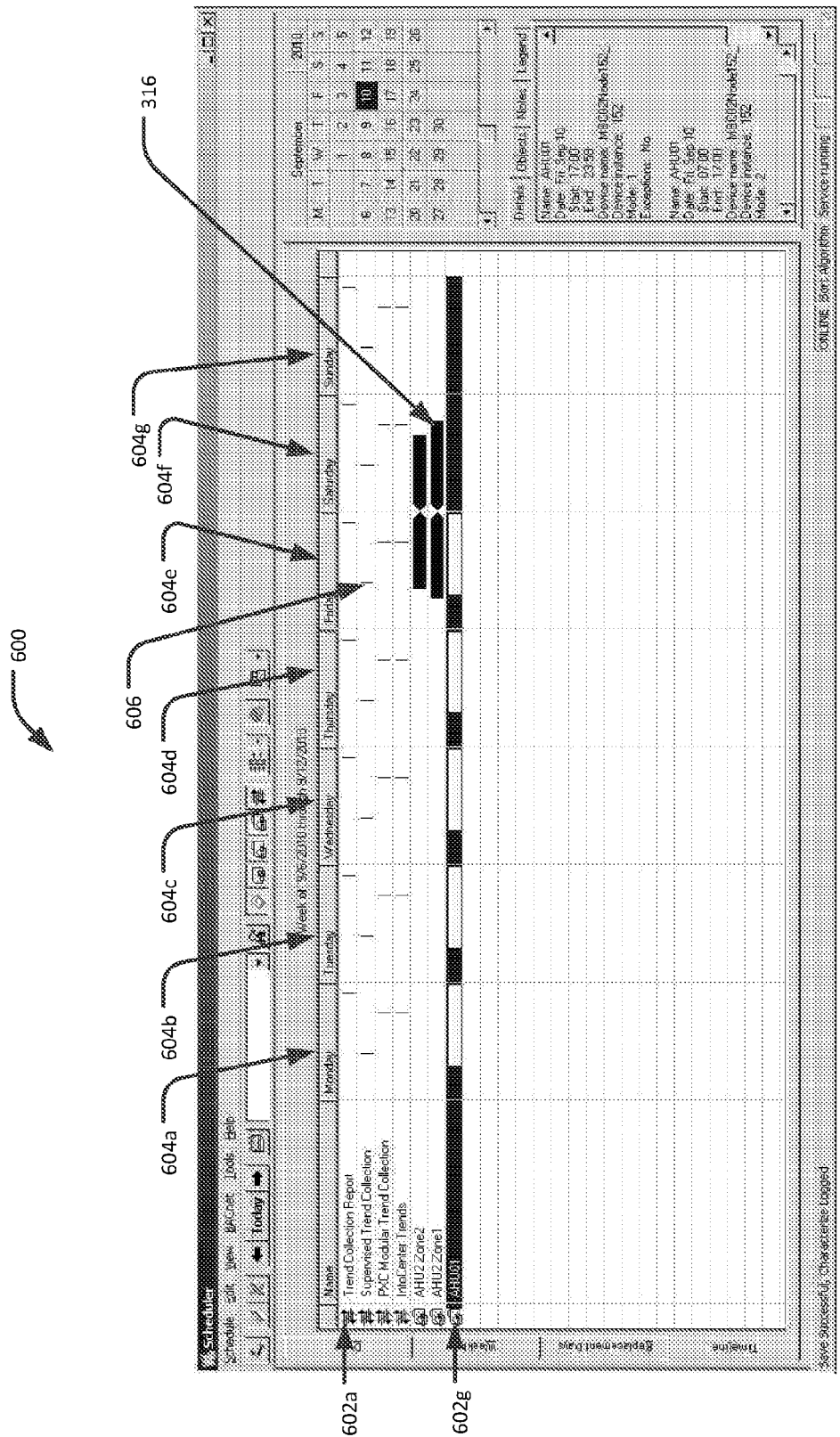
FIG. 6 illustrates another embodiment of a schedule and layout generated in accordance with the disclosure provided herein.

The operation scheduler module 201 portion of automation control tool 200 may configure each panel 302 to 314 (or any other desired number of panels) to display the information within each of the reduced data files 260 in daily, weekly, monthly or yearly, etc. views by comparing the schedule data or information to a defined date range. If the schedule is determined to fall within the date range displayed by the operations scheduler, then the automation control tool 200 extracts the appropriate schedule data from the reduced data file 260 for display in a user accessible manner as illustrated in the exemplary unified schedule shown in FIG. 3. In other embodiments, the schedule data may be displayed as a flow-chart, a horizontal linear format as a list of event times and/or durations, or in any other desired format. FIG. 6 illustrates an exemplary embodiment of a unified schedule 600 that may be generated by the operation scheduler module 201. In this illustrated embodiment, the unified schedule 600 includes a number of schedules 602a to 602g operable over multiple days 604a to 604g. For example, the start times for a report generation or data collection process controlled by one or more of the schedule 602a to 602g is indicated with a hash mark 606. Similarly, the operational or activity period corresponding to a device or group of devices 114, 116, 118 and 120 is indicated by a time line 316.

The disclosed automation control tool 200 and the operation scheduler module 201 may be configured to receive schedule or operation information contained within the reduced data file 260 relating to each of the automation devices 114, 116, 118 and 120 deployed within the building automation system 100. In order to efficiently utilize the network resources and bandwidth, the reduced data files may be retrievably stored at the field panels 106 deployed throughout the structure and accessible via one or more of the networks 102, 110, 112, 122, 124 and 126. The received schedule or operation information contained in each of the reduced data files 260 may be provided by an automation device 114, 116, 118 and 120 formatted and operating according to a different building automation format and/or communication protocol depending on the type of equipment, supplier of the equipment, etc. The disclosed automation control tool 200 and the operations scheduler provides a mechanism by which the building automation format and/or communication protocol may be stripped away and filtered out to generate a commonly formatted reduced data file 260 for each of the automation devices 114, 116, 118 and 120. The commonly formatted reduced data files 260 allow for common, centralized editing or management of the schedule and operation information by the automation control tool 200 and the operations schedule.

Herein, the phrases "coupled with", "in communication with" and "connected to" are defined to mean components arranged to directly or indirectly exchange information, data and commands through one or more intermediate components. The intermediate components may include both hardware and software based components. Moreover, the phrase "operatively coupled" is defined to mean two or more devices configured to share resources or information either directly or indirectly through one or more intermediate components.

From the above descriptions, it is to be inferred that the disclosed devices, systems and methods are highly adaptable and configurable. The flexible nature of the disclosed devices, systems and methods allow for a wide variety of implementations and uses for the discussed and disclosed technology and algorithms. Thus, it should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A building automation control system configured to manage and control multiple automation components coupled via a building automation network, the building automation control system comprising:
   a processor;
   a memory in communication with the processor, the memory configured to store a building automation control tool as one or more processor implementable instructions and wherein the processor implementable instructions are configured to:
      receive a first operational schedule related to operation of a first automation device, the first operational schedule comprising a first start time and a first stop time for the first automation device, and a report or collection routine start time;
      receive a second operational schedule comprising a second start time and a second stop time related to the operation of a second automation device;
      recognize the first and second start and stop times associated with the first and second operational schedules, respectively; and
      generate a unified schedule that:
         displays the first operational schedule as a first time period that extends between the first start time and the first stop time, and a point when the report or collection routine starts; and
         displays the second operational schedule as a second time period that extends between the second start time and the second stop time,
      wherein the second time period is aligned relative to the first time period.

2. The building automation control system of claim 1, wherein the first operational schedule comprises first operation information formatted according to a first protocol.

3. The building automation control system of claim 2, wherein the second operational schedule comprises second operation information formatted according to a second protocol.

4. The building automation control system of claim 1, wherein the processor implementable instructions are further configured to:
   receive a schedule command related to first operation information, second operation information, or a combination thereof; and
   generate, in response to the received schedule command, a third operation information that alters one of the first operation information and the second operation information.

5. The building automation control system of claim 4, wherein the processor implementable instructions are further configured to:
   store copies of the third operation information at the first automation device.

6. The building automation control system of claim 5, wherein the processor implementable instructions are further configured to:
   store copies of the third operation information at a central database.

7. The building automation control system of claim 1, wherein the first automation device is a BACnet-compatible device operating according to a first protocol.

8. The building automation control system of claim 7, wherein the second automation device is a BACnet-compatible device operating according to a second protocol.

9. The building automation control system of claim 1, wherein the first automation device and the second automation device are grouped to define a zone.

10. The building automation control system of claim 9, wherein the zone is a first zone, and
   wherein the first zone is combined with a second zone to define an equipment group.

11. A computer-implemented method for managing and controlling multiple automation components coupled via a building automation network, the computer implemented method comprising:
   receiving, via the building automation network, a first operational schedule detailing a first operational period of a first automation device from the first automation device, wherein the first operational schedule is formatted according to a first protocol;
   receiving, via the building automation network, a second operational schedule detailing a second operational period of a second automation device, wherein the second operational schedule is formatted according to a second protocol, at least the first operational schedule or at least the second operational schedule comprising a report or collection routine start time;

converting the received second operational schedule from the second protocol to the first protocol;

generating a unified schedule based on the first operational schedule and the converted second operational schedule, wherein the unified schedule arranges a first operational time period of the first operational schedule relative to a second operational time period of the second operational schedule; and displaying the unified schedule in a user accessible manner.

12. The computer-implemented method of claim 11, wherein the first operational time period includes a start time and a stop time.

13. The computer-implemented method of claim 12, wherein the second operational time period includes a start time and a stop time.

14. The computer-implemented method of claim 13, wherein displaying the unified schedule comprises:

generating a display interface including a first linear timeline representing the first operational time period, and a second linear timeline representing the second operational time period.

15. The computer-implemented method of claim 14, wherein the first linear timeline is displayed relative to the second linear timeline over a common operational period encompassing both the first operational period and second operational period.

16. The computer-implemented method of claim 11 further comprising:

detecting an input corresponding to a schedule command related to the second operational schedule;

altering the second operational schedule in response to the schedule command; and storing the altered second operational schedule in a local database.

17. The computer-implemented method of claim 16, wherein altering the second operational schedule further comprises:

generating a third operational schedule, wherein the third operational schedule corresponds to the altered second operational schedule.

18. The computer-implemented method of claim 17 further comprising:

converting the third operational schedule from the first protocol to the second protocol.

19. The computer-implemented method of claim 18 further comprising:

communicating, via the building automation network, at least the third operational schedule to the second automation device; and storing the third operational schedule at the second automation device.

20. The computer-implemented method of claim 19 further comprising:

storing copies of the third operation schedule at a central database.

21. The computer-implemented method of claim 11 further comprising:

grouping the first automation device and the second automation device together to define a zone.

22. The computer-implemented method of claim 21 further comprising:

generating a copy of the unified schedule formatted according to a second protocol;

communicating, via the building automation network, the copy of the unified schedule to the second automation device; and communicating, via the building automation network, the unified schedule to the first automation device.

23. The computer-implemented method of claim 22 further comprising:

operating the first automation device according to the unified schedule; and operating the second automation device according to the copy of the unified schedule.

24. A computer-implemented method for managing and controlling multiple automation components coupled via a building automation network, the computer implemented method comprising:

generating, at a workstation, a unified schedule that includes a first operational schedule related to operation of a first automation device displayed relative to a second operational schedule associated with a second automation device, at least the first operational schedule or at least the second operational schedule comprising a report or collection routine start time;

determining operational protocols for the first automation device and the second automation device;

communicating, via the building automation network, the first operational schedule to the first automation device according to a first protocol;

converting the second operational schedule to a second protocol;

communicating, via the building automation network, the second operational schedule to the second automation device according to the second protocol; and executing the first operational schedule at the first automation device, and the second operational schedule at the second automation device.

25. The computer-implemented method of claim 24, wherein generating the unified schedule further comprises:

displaying the first operational schedule as a linear graphic relative to a second linear graphic representative of the second operational schedule.

26. The computer-implemented method of claim 25, wherein the first and second linear graphic are scaled with respect to a common time period.

27. The computer-implemented method of claim 26, wherein a second plurality of compressed data represents a select portion of a second data structure utilized by the second automation device.

28. The computer-implemented method of claim 24, further comprising:

storing copies of the first operational schedule and the second operational schedule at a central database.

29. The computer-implemented method of claim 24 further comprising:

grouping the first automation device and the second automation device together to define a zone.

30. The computer-implemented method of claim 24, wherein the first operational schedule includes a first plurality of data in a compressed format.

31. The computer-implemented method of claim 30, wherein the second operational schedule includes a second plurality of data in the compressed format.

32. The computer-implemented method of claim 30, wherein the compressed format is defined by a selectively reduced data structure.

33. The computer-implemented method of claim 24, wherein a first plurality of compressed data represents a first version of scheduling data, and a second plurality of compressed data represents a second version of same scheduling data.

34. The computer-implemented method of claim 24, wherein a first plurality of compressed data represents a select portion of a first data structure utilized by the first automation device.

35. A computer-implemented method for managing and controlling multiple automation components coupled via a building automation network, the computer implemented method comprising:
- receiving, via the building automation network, a first operational schedule formatted according to a first protocol from a first automation component, wherein the first operational schedule comprises a first plurality of compressed data;
- receiving, via the building automation network, a second operational schedule formatted according to a second protocol, wherein the second operational schedule comprises a second plurality of compressed data, at least the first operational schedule or at least the second operational schedule comprising a report or collection routine start time;
- converting the received second operational schedule from the second protocol to the first protocol;
- generating a unified schedule based on the first plurality of compressed data, and the second plurality of compressed data;
- displaying the unified schedule in a user accessible manner.

* * * * *